US005361744A

United States Patent [19]

Teraoka

[11] Patent Number: 5,361,744

[45] Date of Patent: Nov. 8, 1994

[54] SUPERCHARGING DEVICE FOR AN INTERNAL COMBUSTION ENGINE

[75] Inventor: Masao Teraoka, Tochigi, Japan

[73] Assignee: Tochigifujisangyo Kabushiki Kaisha, Japan

[21] Appl. No.: 22,177

[22] Filed: Feb. 24, 1993

[30] Foreign Application Priority Data

Feb. 26, 1992 [JP] Japan ................................ 4-039457
Mar. 31, 1992 [JP] Japan ................................ 4-105868

[51] Int. Cl.[5] ........................ F02B 39/04; F16H 55/56

[52] U.S. Cl. ........................................ 123/561; 474/15; 474/18; 474/28; 474/46

[58] Field of Search .................... 123/561; 474/13, 14, 474/15, 18, 28, 46

[56] References Cited

U.S. PATENT DOCUMENTS

| | | | |
|---|---|---|---|
| 3,052,132 | 9/1962 | Dittrich et al. | 474/18 |
| 4,174,641 | 11/1979 | Hillman . | |
| 4,229,988 | 10/1980 | Rattunde | 474/28 |
| 4,360,353 | 11/1982 | Hattori et al. | 474/46 |
| 4,563,997 | 1/1986 | Aoki | 123/561 |
| 5,117,799 | 6/1992 | Suzuki et al. | 123/561 |

FOREIGN PATENT DOCUMENTS

| | | | |
|---|---|---|---|
| 2253954 | 12/1974 | France . | |
| 2566082 | 6/1984 | France . | |
| 2614649 | 2/1988 | France . | |
| 3933409 | 4/1991 | Germany . | |
| 60-209627 | 3/1986 | Japan . | |
| 69400 | 5/1989 | Japan . | |
| 3-3925 | 1/1991 | Japan | 123/561 |
| 500564 | 2/1991 | Japan . | |
| 1034017 | 7/1963 | United Kingdom . | |
| 2132711 | 7/1984 | United Kingdom . | |
| 2220038 | 12/1989 | United Kingdom . | |
| 2230817 | 6/1990 | United Kingdom . | |

*Primary Examiner*—Michael Koczo
*Attorney, Agent, or Firm*—Graham & James

[57] ABSTRACT

A supercharging device for an internal combustion engine includes a runner for compressing air, a driven pulley for rotating the runner, and a drive pulley for rotating the driven pulley. The drive pulley has a fixed sheave and a movable sheave movable in an axial direction with respect to the fixed sheave. A belt is wound around the driven pulley and the drive pulley. A control device is for moving the movable sheave in an axial direction so that the movable sheave is moved away from the fixed sheave under a low load condition and that said movable sheave is moved towards the fixed sheave under a high load condition.

5 Claims, 5 Drawing Sheets

SUPERCHARGING DEVICE FOR AN INTERNAL COMBUSTION ENGINE

BACKGROUND OF THE INVENTION

This invention relates to a supercharging device for supercharging an internal combustion engine to increase an output level and, in particular, to a supercharging device comprising a mechanical supercharger operated at a rotation speed controlled by a continuously variable transmission of a centrifugal weight type.

A conventional mechanical supercharger operated at a rotation speed controlled by a continuously variable transmission (often abbreviated to CVT) of a centrifugal weight type is disclosed in Japanese Patent Prepublication No. 500564/1991. In this supercharger, the continuously variable transmission is driven by the internal combustion engine. A runner shaft with a runner is rotatably supported on a housing and driven by a secondary pulley (driven pulley) of the continuously variable transmission through an electromagnetic clutch and a speed increasing gear train. Thus, the internal combustion engine is supercharged. The above-mentioned Japanese Patent Prepublication contains no disclosure about a primary pulley (drive pulley) of the continuously variable transmission. An applicable arrangement of the primary pulley and the secondary pulley is disclosed, for example, in Japanese Utility Model Prepublication No. 69400/1989. In this arrangement, each of the drive pulley and the driven pulley comprises a fixed sheave (disk) and a movable sheave faced to each other. The fixed sheaves of the drive pulley and the driven pulley are arranged on the opposite sides. The movable sheaves serve to vary the widths of V-shaped grooves of the drive pulley and the driven pulley. Either one of the pulleys has a weight for generating a centrifugal force and a spring for generating an urging force against the centrifugal force. Within a predetermined range of load, the conventional supercharger is controlled by the continuously variable transmission to be kept at a substantially constant rotation speed irrespective of variation of an engine rotation speed. Only in a high load condition which requires a supercharging operation, the supercharger is operated by power transmission through the electromagnetic clutch to improve performance of the internal combustion engine.

Once a certain engine rotation speed is reached, the conventional mechanical supercharger with the CVT of a centrifugal weight type is controlled to be kept at a predetermined constant rotation speed irrespective of variation of the load imposed on the internal combustion engine. In this connection, the supercharger reaches such a rotation speed (high-speed rotation) even under a partial load condition which requires no supercharging operation. To drive such a high-speed rotation, fuel consumption is increased. This results in decrease of a fuel efficiency. In view of the above, the electromagnetic clutch is used to cut off power transmission to the supercharger under the partial load condition. However, drivability is unfavorably affected by on/off operation responsive to variation of the load. Taking the above into consideration, a cutoff range inevitably becomes small. After all, the fuel efficiency is decreased.

SUMMARY OF THE INVENTION

It is an object of this invention to provide a supercharging device which has a reduced influence upon drivability as well as an improved fuel efficiency.

In order to achieve the above-mentioned object, this invention provides a supercharging device for an internal combustion engine, comprising:

a runner compressing air;

a driven pulley rotating the runner;

a drive pulley rotating the driven pulley, the drive pulley having a fixed sheave and a movable sheave movable in an axial direction with respect to the fixed sheave;

a belt wound around the driven pulley and the drive pulley; and a control device moving the movable sheave in the axial direction so that the movable sheave is moved away from the fixed sheave under a low load condition and that the movable sheave is moved towards the fixed sheave under a high load condition.

In the above-mentioned supercharging device, under the low load condition during a normal operation, the movable sheave of the drive pulley is moved by the control device against an urging force of urging means to increase the width of a V-shaped groove. Accordingly, the supercharger is driven at a speed-reducing side or a low-speed rotation side. This saves fuel consumption. On the other hand, under the high load condition during the normal operation, the control device controls the movable sheave of the drive pulley to reduce the width of the V-shaped groove. In this event, the supercharger is operated at a maximum rotation speed within a predetermined range to carry out a supercharging operation. With this structure, durability is maintained. Transition from the low-speed rotation side to the high-speed rotation side and vice versa is carried out with respect to the Intermediate-speed rotation. Accordingly, it is possible to avoid occurrence of shock which the conventional device suffers due to power cutoff. This improves drivability.

DESCRIPTION OF THE PREFERRED EMBODIMENTS FIRST EMBODIMENT

Figure 1:
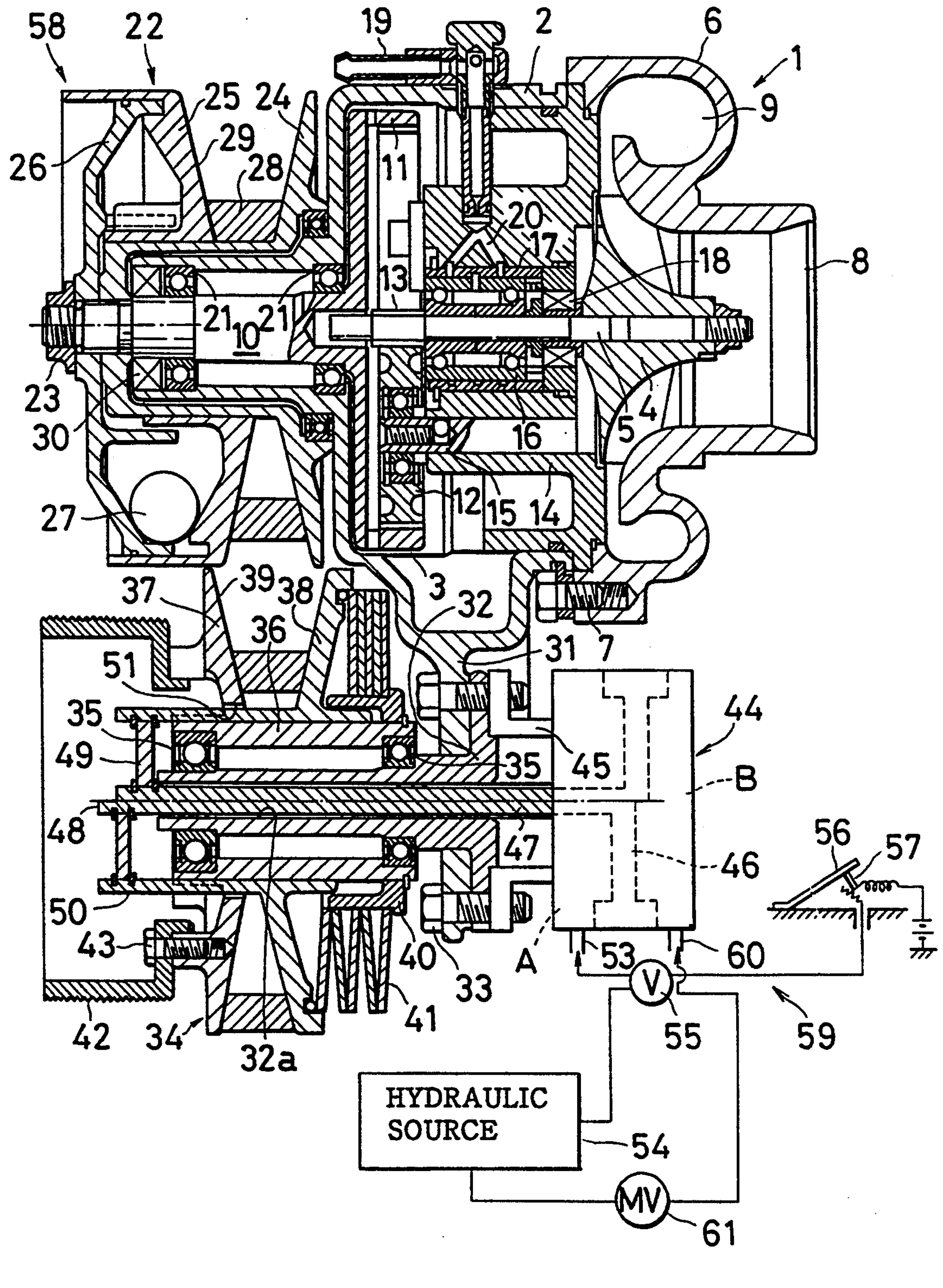
FIG. 1 is a sectional view of a supercharging device for an internal combustion engine according to a first embodiment of this invention.

Referring to FIG. 1, a first embodiment of this invention will be described. Description will at first be directed to the structure. A mechanical supercharger 1 has a housing 2 mounted on an assembly such as an internal combustion engine which is not shown. A speed increasing gear train 3 and a runner shaft 5 with a runner 4 are accommodated in the housing 2. The housing 2 is integrally coupled with a shroud 6 by a bolt 7. The shroud 6 has an air inlet 8 of a horizontal cylinder and an air outlet 9 of a spiral shape.

The acceleration gear train 3 comprises an internal gear 11 integral with an input shaft 10, a pair of pinions 12, and a sun gear 13. Each of the pinions 12 is rotatably supported on a shaft 15. The shaft 15 is supported by a boss 14 which is fixed between the housing 2 and the shroud 6. Although only one is shown in the figure, both of the pinions 12 are engaged with the sun gear 13 and the internal gear 11. The sun gear 13 is integrally formed with the runner shaft 5 and is rotatably supported on the boss 14 through a double row angular contact ball bearing 16 and a spacer 17. The runner shaft 5 is provided with a mechanical seal 18 on the rear side of the runner 4. The ball bearing 16 is supplied with lubricating oil through a path 20 from a lubricant supply pipe 19 formed at the top of the housing 2.

The input shaft 10 is rotatably supported on the housing 2 through two ball bearings 21 and 21 at the left of the housing 2.

The input shaft 10 is integrally coupled with a driven pulley 22 through a nut 23 at the left end. The driven pulley 22 has a fixed sheave 24 and a movable sheave 25 on the right side and the left side, respectively. The fixed sheave 24 is fixed to the input shaft 10. The movable sheave 25 is movable in an axial direction with respect to the fixed sheave 24. A V-shaped groove 29 is formed between the fixed sheave 24 and the movable sheave 25 to receive a belt 28 wound around the V-shaped groove 29. A fly weight 27 for generating a centrifugal force is held between a rear surface of the movable sheave 25 and a conical plate 26 fixedly coupled to the input shaft 10. In the figure, a reference numeral 30 represents an oil seal. In the figure, the V-shaped groove 29 is shown in a widened state and a narrowed state above and below a dash-and-dot line, respectively.

The housing 2 has a flange 31 extending in a downward direction. A fixed shaft 32 is fixedly attached to the flange 31 through a bolt 33 and horizontally extends in a leftward direction. A drive pulley 34 is rotatably supported on the fixed shaft 32 through ball bearings 35 and 35. The drive pulley 34 has a fixed sheave 37 and a movable sheave 38 on the left side and the right side, respectively. A V-shaped groove 39 is formed between the fixed sheave 37 and the movable sheave 38.

The axial position of the fixed sheave 37 is determined with respect to the fixed shaft 32. The fixed sheave 37 integrally has a cylindrical portion 36 which holds outer races of the ball bearings 35 and 35 so that the fixed sheave 37 is rotatable at that position. The fixed sheave 37 is integrally connected with the cylindrical portion 36 as shown by the dashed lines in FIG. 1.

The movable sheave 38 has five disk springs 41 between its rear surface and an end plate 40 positioned on the cylindrical portion 36. The movable sheave 38 is movable along an axial direction in response to an urging force of the disk springs 41. At the left, the fixed sheave 37 is connected through a bolt 43 to a pulley 42. The pulley 42 is driven by a crank shaft of the internal combustion engine through a flat belt. Thus, a continuously variable transmission 58 is formed by a combination of the drive pulley 34 with the disk springs 41, the driven pulley 22 with the fly weight 27, and the belt 28. In the figure, the V-shaped groove 39 is shown in a widened state and a narrowed state above and below a dash-and-dot line, respectively. The V-shaped groove 39 is urged by the disk springs 41 to be put into the narrowed state.

An actuator 44 is fastened to the flange 31 through a bracket 45 and the bolt 33. The actuator 44 contains a piston 46 and a rod 47 integral with the piston 46 and horizontally extending in a leftward direction. The rod 47 extends through a center hole 32*a* of the fixed shaft 32. The rod 47 has a left end 48 coupled with a horizontal arm 50 through a thrust bearing 49. After penetrating through an aperture 51 of a circular boss of the fixed sheave 37, the arm 50 is integrally formed with the movable sheave 38. The actuator 44 has a left chamber A at the left of the piston 46. The left chamber A is supplied with hydraulic fluid from a hydraulic source 54 through an inlet 53. The flow is controlled by a degree of opening of a valve 55. The valve 55 is connected to a regulator 57 for controlling the valve 55 so that the degree of opening is great under a low load condition corresponding to a small degree of opening of an accelerator pedal 55. With increase of the load, less hydraulic pressure is supplied. A maximum hydraulic pressure and a null hydraulic pressure are supplied under the low load and the high load conditions, respectively.

The actuator 44 has a right chamber B supplied with the hydraulic fluid from the hydraulic source 54 through an inlet 60 under control of a manually-operated valve (MV) 61. The manually-operated valve (MV) 61 is operated in case of emergency where a driver urgently requires a high output level, for example, in order to pass a car running ahead.

Figure 2:
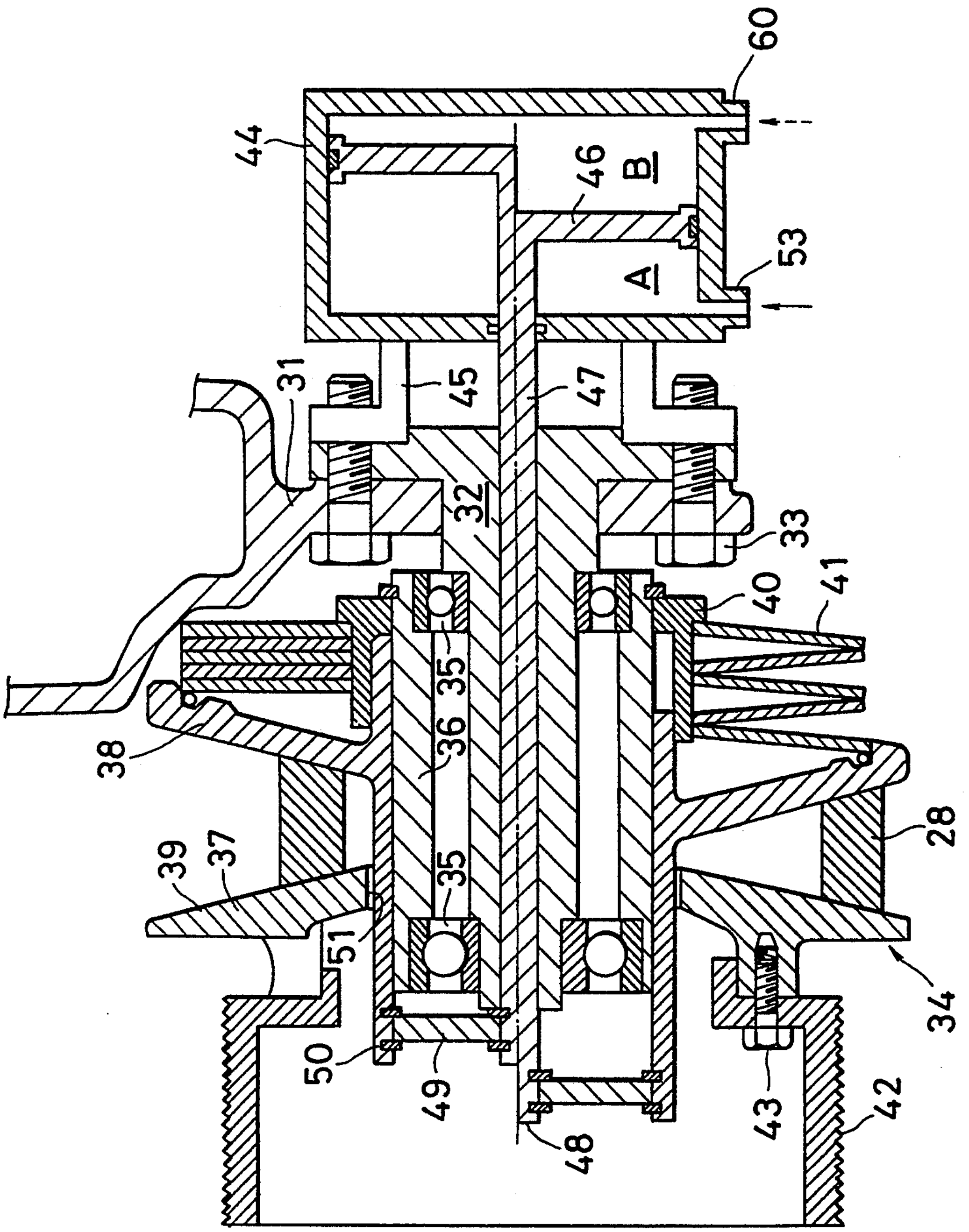
FIG. 2 is a sectional view of a drive pulley controlled by an actuator illustrated in FIG. 1.

FIG. 2 shows the driven pulley 34 in detail in various conditions where the hydraulic fluid is supplied to the left chamber A and the right chamber B of the actuator 44.

In the upper half above a dash-and-dot line in FIG. 2, the left chamber A is supplied with the maximum hydraulic fluid (under the low load condition). In the lower half below the dash-and-dot line, no hydraulic oil is supplied (under the high load condition). The right chamber B is supplied with the hydraulic fluid under the high output condition in case of emergency.

During the normal operation and the high output operation of the engine, a combination of the actuator 44, the hydraulic source 54, the valve 55, the regulator 57, and the manually-operated valve 61 serves to vary the rotation speed of the supercharger 1 by controlling the urging force of the disk springs 41 of the drive pulley 34. Thus, the combination of these components forms a control device 59 for controlling the continuously variable transmission 58.

Next, operation of the above-mentioned embodiment will be described. During the normal operation, the valve 55 is controlled by the regulator 57 to be fully opened under the low load condition corresponding to a small degree of opening of the accelerator pedal 56. The maximum hydraulic fluid (MAX) is supplied from the hydraulic source 54 through the valve 55 and the inlet 53 to the left chamber A of the piston 46 of the actuator 44. Accordingly, the piston 46 moves in a rightward direction and draws the rod 47 rightwards (indicated by the upper half of the rod 47 in FIGS. 1 and 2). The arm 50 pushes the movable sheave 38 of the drive pulley 34 in a rightward direction to contract the disk springs 41 into a substantially vertical position. Accordingly, the V-shaped groove 39 of the drive pulley 34 is widened to provide a small diameter while the V-shaped groove 29 of the driven pulley 22 is narrowed to provide a large diameter. Thus, the driven pulley 22 is driven at a speed-reduction side or a low-speed rotation side, in this state, the increase of the rotation speed of the drive pulley 34 is followed by a substantially proportional increase of the rotation speed of the driven pulley 22, as depicted by maximum hydraulic pressure line, line "a" in FIG. 3.

Since the driven pulley 22 provides a low-speed rotation under the low load condition, the supercharger 1 is operated at a low-speed rotation and therefore requires a small driving torque. Thus, fuel efficiency is improved.

Under a high load condition corresponding to a large degree of opening of the accelerator pedal 56, the regulator 57 makes the valve 55 be completely closed. The actuator 44 is supplied with no hydraulic pressure. Accordingly, the piston 46 moves leftwardly together with the rod 47. The movable sheave 38 of the drive pulley 34 moves to narrow the V-shaped groove 39 in response to the urging force of the disk springs 41 (see the lower half of the driven pulley 34 in FIGS. 1 and 2).

Then, the V-shaped groove 29 of the driven pulley 22 is widened (see the upper half of the driven pulley 22 in FIG. 1). As a result, the driven pulley 22 is controlled at a speed-increasing side or a high-speed side, as depicted by a line "b" in FIG. 3 at the null hydraulic pressure.

Thus, the supercharger 1 supercharges the internal combustion engine by high-speed rotation of the driven pulley 22, the input shaft 10, the speed-increasing gear train 3, the sun gear 13, the runner shaft 5, and the runner 4 to increase the output level. The high-speed rotation is determined in dependence upon the balance with the urging forces of the fly weight 27 and the disk springs 41 and is kept within a predetermined range. Therefore, the high-speed rotation can be repeated with an excellent durability.

Figure 3:
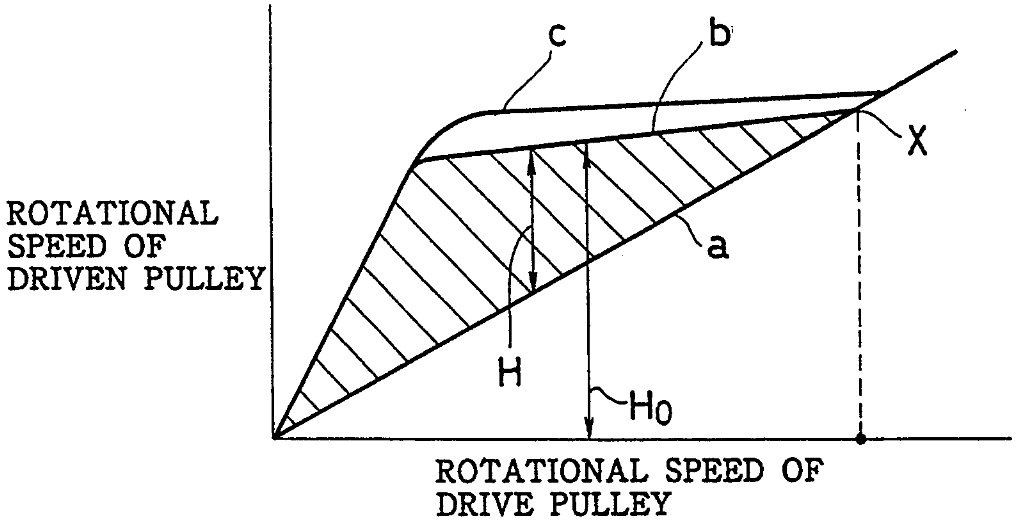
FIG. 3 shows a performance curve for describing an operation of the supercharging device illustrated in FIG. 1.

In this embodiment, transition from the low load condition to the high load condition and vice versa only requires a difference H between the lines "a" and "b" in FIG. 3. Accordingly, the shock due to speed variation is suppressed. This improves the drivability.

On the other hand, the conventional supercharger with the electromagnetic clutch requires a difference $H_0$ with the line b in the figure. Accordingly, the shock is considerably great to adversely affect the drivability.

As described, the normal operation including the low load and the high load conditions is indicated by a hatched area between the lines a and b in FIG. 3.

Upon the high output condition beyond the normal operation, such as urgent passing in a highway, the driver manually operates the manually-operated valve 61. Then, the hydraulic fluid is introduced into the right chamber B of the actuator 44 from the hydraulic source 54 through the manually-operated valve 61 and the inlet 60. As illustrated in FIG. 2, the piston 46 further leftwardly moves to narrow the V-shaped groove 39 at minimum in cooperation with the urging force of the disk springs 41. Thus, the supercharger 1 is rotated at an ultrahigh speed and provides a high output level emergently. Thus, the driver's demand is satisfied. This condition is depicted by a line "c" in FIG. 3.

According to this invention, it is thus possible to improve fuel efficiency and durability and to achieve a high output level.

Figure 4:
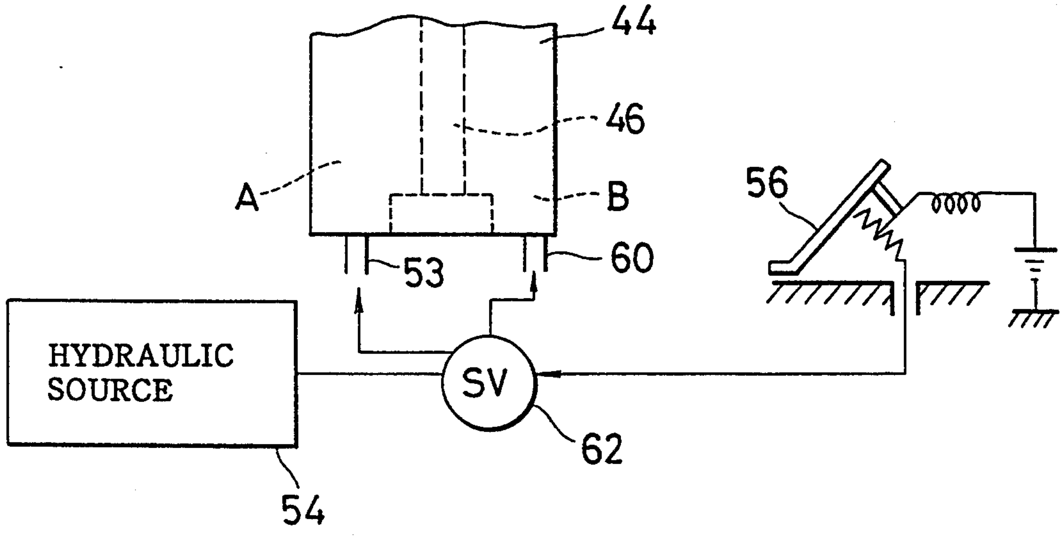
FIG. 4 shows a structure of a modification of a control device illustrated in FIG. 1.

Referring to FIG. 4, a modification of the control device 59 will be described. The valves 55 and 61 in FIG. 1 are replaced by a single three-way valve (SV) 62 which is controlled by the accelerator pedal 56.

When a step range of the accelerator pedal 56 is within the normal operation between the low load and the high load conditions, the three-way valve 62 controls the flow of the hydraulic fluid through the inlet 53 of the left chamber A. When the accelerator pedal 56 is stepped at maximum (in case of emergency and not usual), the three-way valve 62 is operated to introduce the hydraulic fluid through the inlet 60 of the right chamber B. Thus, similar effect is obtained as in the foregoing embodiment.

SECOND EMBODIMENT

Figure 5:
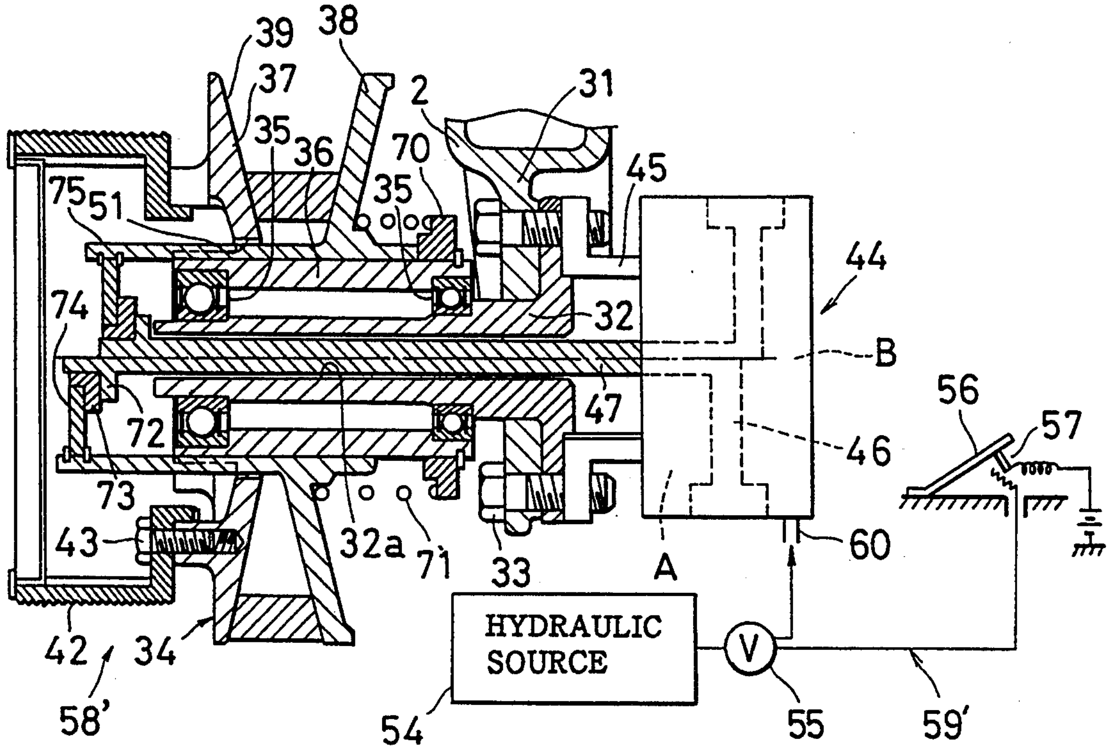
FIG. 5 is a sectional view of a supercharging device according to a second embodiment of this invention.
Figure 6:
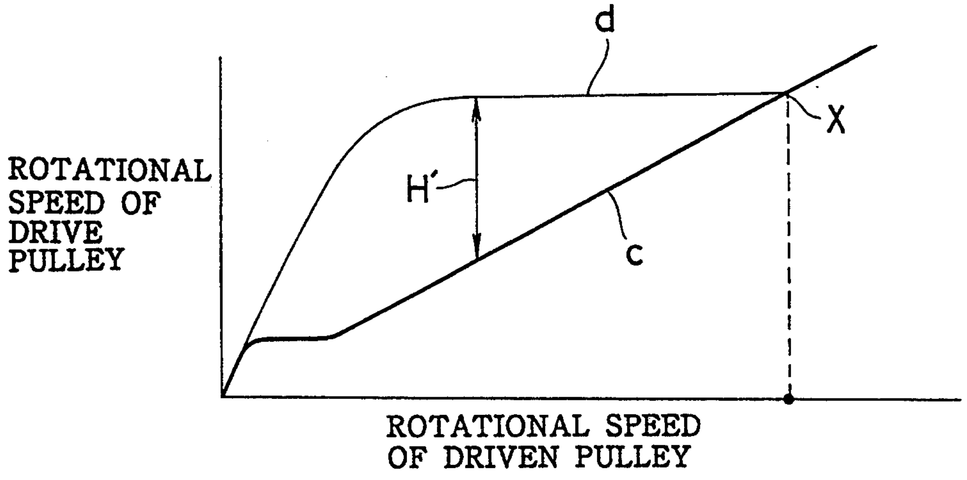
FIG. 6 shows a performance curve for describing an operation of the supercharging device illustrated in FIG. 5.

Referring to FIGS. 5 and 6, a second embodiment of this invention will be described.

FIG. 5 shows a modification of the lower part of FIG. 1. Similar parts are designated by like reference numerals as those in FIG. 1.

In FIG. 5, modified portions are as follows.

(a) An end plate 70 positioned with respect to the rear surface of the movable sheave 38 and the cylindrical portion 36.

(b) A coil spring 71 for axially urging the movable sheave 38.

(c) The rod 47 has, at its left end, a circular disk portion 72 coupled through a thrust bearing 73 and a circular disk 74 to an extending portion 75 of the movable sheave 38.

(d) The inlet 60 of the right chamber of the piston 46 of the actuator 44.

With reference to the above-enumerated modified portions, the structure of the embodiment in FIG. 5 will be described.

The housing 2 has the flange 31 extending in a downward direction. The fixed shaft 32 is fixedly attached to the flange 31 through the bolt 33 and horizontally extends in the leftward direction. The drive pulley 34 is rotatably supported on the fixed shaft 32 through the ball bearings 35 and 35. The drive pulley 34 has the fixed sheave 37 and the movable sheave 38 on the left side and the right side, respectively. The V-shaped groove 39 is formed between the fixed sheave 37 and the movable sheave 38.

The axial position of the fixed sheave 37 is determined with respect to the fixed shaft 32. The fixed sheave 37 integrally has the cylindrical portion 36 which holds the outer races of the ball bearings 35 and 35 so that the fixed sheave 37 is rotatable at that position.

The movable sheave 38 has the coil spring 71 between its rear surface and the end plate 70 positioned on the cylindrical portion 36. The movable sheave 38 is movable along the axial direction in response to the urging force of the coil spring 71. At the left, the fixed sheave 37 is connected through the bolt 43 to the pulley 42. The pulley 42 is driven by the crank shaft of the internal combustion engine through the flat belt. Thus, a continuously variable transmission 58′ is formed by a combination of the drive pulley 34 with the coil spring 71, the driven pulley 22 with the fly weight 27, and the belt 28.

The actuator 44 is fastened to the flange 31 through the bracket 45 and the bolt 33. The actuator 44 contains the piston 46 and the rod 47 integral with the piston 46 and horizontally extending in a leftward direction. The rod 47 has, at its left end, the circular disk portion 72 coupled with the extending portion 75 of the movable sheave 38 through the thrust bearing 73 and the circular disk 74. The actuator 44 has the right chamber at the right of the piston 46. The right chamber is supplied with hydraulic fluid from the hydraulic source 54 through the inlet 60. The flow is controlled by a degree of opening of the valve 55.

The valve 55 is connected to the regulator 57 so as to operate in the manner which will presently be described. Thus, a control device 59' for controlling the continuously variable transmission 58' is formed. Specifically, the valve 55 is completely closed during the low load condition so that the inlet 60 of the right chamber of the actuator 44 is supplied with the no hydraulic pressure. In this state of the actuator 44, it is assumed that the rod 47 is rightward moved as illustrated in the upper half of FIG. 5. The coil spring 71 is set so that the V-shaped groove 39 of the drive pulley 34 is widened.

Under the high load condition, the valve 55 is fully opened to introduce the maximum hydraulic pressure into the right chamber. In this state, the V-shaped groove 39 is narrowed as shown in the lower half of FIG. 5 to the contrary.

Next, the operation of this embodiment will be described referring to FIGS. 5 and 6.

During the low load condition illustrated in the upper half of FIG. 5, the chamber B of the actuator 44 is supplied with no hydraulic pressure. The rod 47 is rightwardly moved and the V-shaped groove 39 is widened. Accordingly, the drive pulley 34 has a reduced diameter to put the continuously variable transmission 58' into the low-speed side. In this state, when the rotation of the drive pulley is increased, the rotation of the driven pulley is varied along null hyrdraulic pressure line, line c in FIG. 6 to reach a point X.

Under the high load condition illustrated in the lower half of FIG. 5, the chamber B of the actuator 44 is supplied with the maximum hydraulic pressure. The rod 47 is leftwardly moved and the V-shaped groove 39 of the drive pulley 34 is narrowed. Accordingly, the drive pulley 34 has an increased diameter to put the continuously variable transmission 58' into the high-speed side. This condition is depicted by maximum hydraulic pressure line, line "d" in FIG. 6. Thus, in this embodiment also, it is possible to improve fuel efficiency and drivability like the preceding embodiment.

In this embodiment, under the high load condition, the operation is determined in dependence upon the balance with a synthetic force of the hydraulic pressure and the urging force of the coil spring 71. Accordingly, the coil spring having a weak urging force is sufficient. In addition, no hydraulic pressure is necessary under the partial load condition which frequently occurs. Thus, the structure of the device is simplified. Since a fundamental tensile force applied on the belt can be selected small, durability of the belt is improved. Furthermore, the spring such as the coil spring is easily selected. In this embodiment, the hydraulic pressure is controlled around the high pressure without continuous variation of the hydraulic pressure in the preceding embodiment. Accordingly, the device is simple in structure. In addition, the response characteristic is improved because of smooth variation upon the increase of the rotation speed.

THIRD EMBODIMENT

Figure 7:
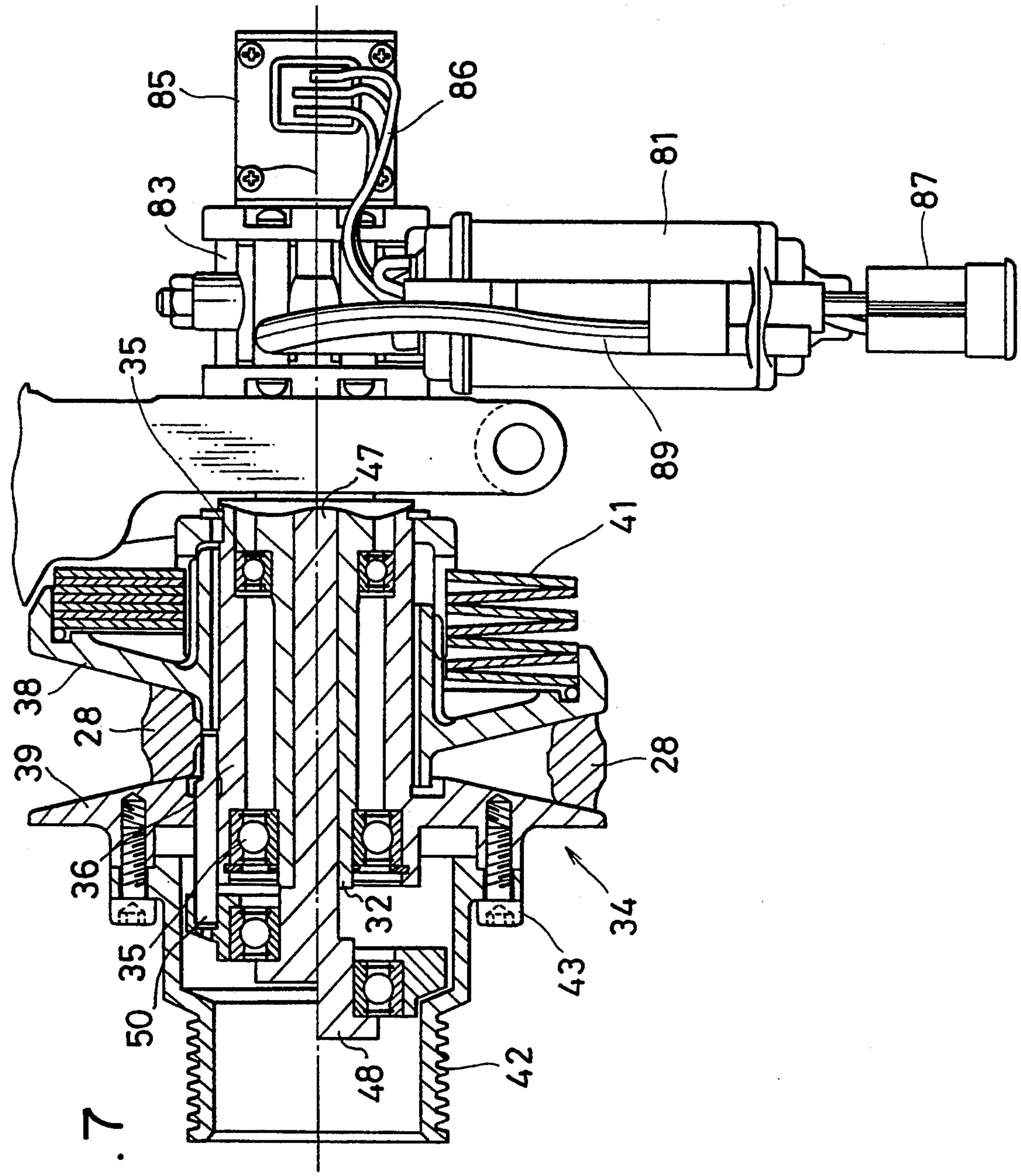
FIG. 7 shows a sectional view of a surpercharging device according to a third embodiment of this invention.

Referring to FIG. 7, a third embodiment of this invention will be described.

FIG. 7 shows a modification of the lower part of FIG. 1. Similar parts are designated by like reference numerals as those in FIG. 1.

In this embodiment, an electric motor 81 is used as an actuator instead of the fluid pressure type actuator 44. The electric motor 81 drives a rod 47 in the axial direction thereof through a gear box 83. The gear box 83 decelerates the rotation of the electric motor 81, converts the rotational force to the linear force and transfer it to the rod 47. The movement of the rod 47 in the axial direction is regulated by the limit switch 85 which is connected with the electric motor 81 through wires 86. The electric motor 81 is connected to an electric source (not shown) through a connector 87. The electric motor 81 is controlled by a regulator cooperatively coupled to an accelerator.

In addition, an electromagnetic solenoid may be used as an actuator instead of the electric motor 81.

What is claimed is:

1. A supercharging device for an internal combustion engine, comprising:

a runner compressing air;

a driven pulley rotating said runner;

a drive pulley rotating said driven pulley, said drive pulley having a fixed sheave and a movable sheave movable in an axial direction with respect to said fixed sheave;

a belt wound around said driven pulley and said drive pulley; and a control device moving said movable sheave in an axial direction so that said movable sheave is moved away from said fixed sheave under a low load condition and said movable sheave is moved towards said fixed sheave under a high load condition;

said control device including an actuator moving said movable sheave, a fluid source for storing fluid for driving said actuator, and a valve controlling a fluid pressure supplied from said source to said actuator;

wherein said control device further comprises urging means for urging said movable sheave towards said fixed sheaves, said actuator supplying said fluid pressure against an urging force of said urging means, said valve controlling said fluid pressure so that said movable sheave is moved away from said fixed sheave under the low load condition and that said movable sheave is moved towards said fixed sheave under the high load condition;

wherein said control device further comprises a manually-operated valve for supplying said fluid pressure from said source to said actuator so as to help said urging force of said urging means.

2. A supercharging device for an internal combustion engine as claim in claim 1, wherein said valve is controlled by a regulator cooperatively coupled to an accelerator pedal.

3. A supercharging device for an internal combustion engine comprising:

a runner compressing air;

a driven pulley rotating said runner;

a drive pulley rotating said driven pulley, said drive having a fixed sheave and a movable sheave movable in an axial direction with respect to said fixed sheave;

a belt wound around said driven pulley and said drive pulley; and a control device moving said movable sheave in an axial direction so that said movable sheave is moved away from said fixed sheave under a low load condition and said movable sheave is moved towards said fixed sheave under a high load condition;

wherein said control device comprises an actuator moving said movable sheave, a source storing fluid for driving said actuator, and a valve for controlling a fluid pressure supplied from said source to said actuator, said valve controlled by an accelerator pedal;

wherein said control device further comprises urging means for supplying an urging force in a predetermined direction for urging said movable sheave towards said fixed sheave, said valve controlling said fluid pressure so that said movable sheave is moved away from said fixed sheave under the low load condition and said movable sheave is moved towards said fixed sheave under the high load condition in accordance with said urging force of said urging means, said valve supplying said fluid pressure to said actuator in a direction similar to that of said urging force of said urging means under a predetermined high load condition.

4. A supercharging device as claimed in claim 3, wherein said valve means comprises a manually-operated valve.

5. A supercharging device for an internal combustion engine as claimed in claim 1 or 3, wherein said urging means includes a disk spring.

* * * * *